US008797912B2

(12) United States Patent
Pollakowski et al.

(10) Patent No.: US 8,797,912 B2
(45) Date of Patent: Aug. 5, 2014

(54) INTEGRATION APPARATUS, COMMUNICATION NETWORK AND METHOD FOR INTEGRATING A NETWORK NODE INTO A COMMUNICATION NETWORK

(75) Inventors: Olaf Pollakowski, Berlin (DE); Henning Sanneck, Munich (DE); Lars Christoph Schmelz, Haar (DE)

(73) Assignee: Nokia Siemens Networks Oy, Espoo (FI)

( * ) Notice: Subject to any disclaimer, the term of this patent is extended or adjusted under 35 U.S.C. 154(b) by 173 days.

(21) Appl. No.: 12/192,800

(22) Filed: Aug. 15, 2008

(65) Prior Publication Data

US 2009/0046599 A1 Feb. 19, 2009

Related U.S. Application Data

(60) Provisional application No. 60/978,960, filed on Oct. 10, 2007, provisional application No. 60/975,945, filed on Sep. 28, 2007, provisional application No. 60/956,287, filed on Aug. 16, 2007.

(51) Int. Cl.
*H04L 12/28* (2006.01)
*H04L 12/24* (2006.01)

(52) U.S. Cl.
CPC ........ *H04L 41/0809* (2013.01); *H04L 41/0806* (2013.01)
USPC .......................................... 370/254; 709/220

(58) Field of Classification Search
USPC ................. 370/254, 256, 335, 351, 389, 392, 370/395.52, 400; 709/201, 208, 220, 223
See application file for complete search history.

(56) References Cited

U.S. PATENT DOCUMENTS 1,572,631 A * 2/1926 Whitmore et al. ............... 65/153
1,590,008 A * 6/1926 Whitmore et al. ............ 324/395
5,751,967 A 5/1998 Raab et al.
(Continued)

FOREIGN PATENT DOCUMENTS

WO 2006/014504 A2 2/2006

OTHER PUBLICATIONS

Reddy et al., "Quality of service provisioning in ad hoc wireless networks: a survey of issues and solutions", Ad Hoc Networks, vol. 4, No. 1, 2006, pp. 83-124.

(Continued)

*Primary Examiner* — Michael J Moore, Jr.
*Assistant Examiner* — Ajay Cattungal
(74) *Attorney, Agent, or Firm* — Staas & Halsey LLP

(57) ABSTRACT

Exemplary embodiments of integration apparatus, communication network and method for integrating a network node into a communication network can be provided. For example, an integration apparatus for integrating a network node into a communication network may include a monitoring device, a policy device, an identifying manager device, a linking manager device, a commissioning manager device. The monitoring device can be configured to detect activating of the network node within the communication network. The identifying manager device can be configured to identify the activated network node. Furthermore, the identifying manager device may be further configured to receive a policy from the policy device. Such exemplary policy may be configured to facilitate an integration of the identified network node into the communication network. The linking manager device can be configured to establish a link between the network node and at least the integration apparatus. Further, the commissioning manager device can be configured to use the link to configure the network node in accordance with the policy.

25 Claims, 5 Drawing Sheets

(56) References Cited

U.S. PATENT DOCUMENTS

| | | | |
|---|---|---|---|
| 6,003,065 A * | 12/1999 | Yan et al. | 709/201 |
| 6,502,190 B1 * | 12/2002 | Faver | 713/2 |
| 6,611,863 B1 | 8/2003 | Banginwar | |
| 7,062,642 B1 | 6/2006 | Langrind et al. | |
| 7,350,067 B2 * | 3/2008 | Spottswood | 713/1 |
| 2002/0194506 A1 * | 12/2002 | Wiley et al. | 713/201 |
| 2003/0123446 A1 * | 7/2003 | Muirhead et al. | 370/392 |
| 2003/0179742 A1 * | 9/2003 | Ogier et al. | 370/351 |
| 2003/0196143 A1 * | 10/2003 | Puri et al. | 714/30 |
| 2004/0078335 A1 * | 4/2004 | Calvesio et al. | 705/50 |
| 2004/0114557 A1 * | 6/2004 | Bryan et al. | 370/338 |
| 2005/0253717 A1 | 11/2005 | Howarth et al. | |
| 2006/0015513 A1 * | 1/2006 | Poyhonen et al. | 707/100 |
| 2006/0026588 A1 * | 2/2006 | Illowsky et al. | 717/171 |
| 2006/0092861 A1 * | 5/2006 | Corday et al. | 370/256 |
| 2006/0101138 A1 * | 5/2006 | Son | 709/223 |
| 2006/0174018 A1 | 8/2006 | Zhu et al. | |
| 2006/0196686 A1 * | 9/2006 | Gatto et al. | 173/191 |
| 2007/0253427 A1 | 11/2007 | Stirbu | |
| 2007/0291770 A1 * | 12/2007 | Kitazoe | 370/395.52 |
| 2008/0045224 A1 * | 2/2008 | Lu et al. | 455/446 |
| 2008/0130508 A1 * | 6/2008 | Vikstedt et al. | 370/241 |
| 2008/0248794 A1 * | 10/2008 | Mirza-Baig | 455/423 |
| 2009/0249795 A1 * | 10/2009 | Chen | 62/3.6 |

OTHER PUBLICATIONS

International Search Report mailed Feb. 6, 2009 and issued in corresponding International Patent Application PCT/EP2008/060667.
Written Opinion of the International Searching Authority for corresponding International Patent Application PCT/EP2008/060667, mailed Feb. 6, 2009.

* cited by examiner

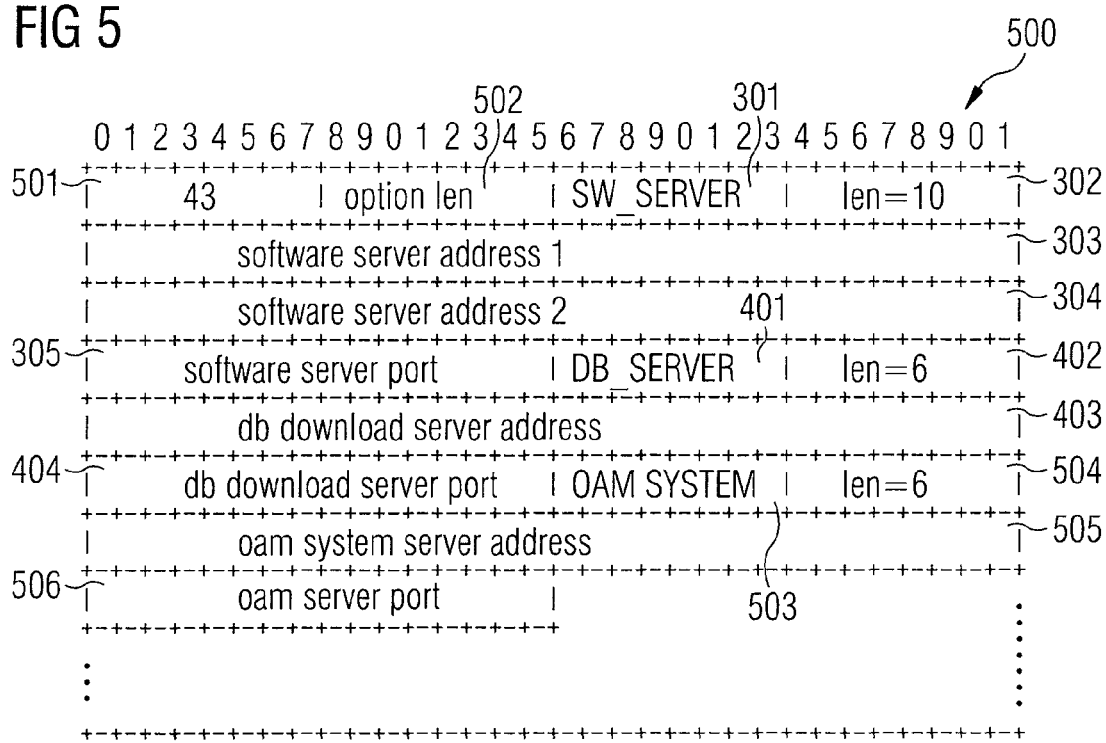

FIG 6

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       OPTION_VENDOR_OPTS      |           option-len           |
+-+-+-+-+-+-+-+-+-+-+-+-+-+-+-+-+-+-+-+-+-+-+-+-+-+-+-+-+-+-+-+-+
|                        enterprise-number                       |
+-+-+-+-+-+-+-+-+-+-+-+-+-+-+-+-+-+-+-+-+-+-+-+-+-+-+-+-+-+-+-+-+
| SOFTWARE-DOWNLOAD-SERVER |          option-len=34              |
+-+-+-+-+-+-+-+-+-+-+-+-+-+-+-+-+-+-+-+-+-+-+-+-+-+-+-+-+-+-+-+-+
|                   software download server address 1           |
|                                                                |
|                                                                |
|                                                                |
+-+-+-+-+-+-+-+-+-+-+-+-+-+-+-+-+-+-+-+-+-+-+-+-+-+-+-+-+-+-+-+-+
|                   software download server address 2           |
|                                                                |
|                                                                |
|                                                                |
+-+-+-+-+-+-+-+-+-+-+-+-+-+-+-+-+-+-+-+-+-+-+-+-+-+-+-+-+-+-+-+-+
|  SW Server Port               |  DB-DOWNLOAD-SERVER            |
+-+-+-+-+-+-+-+-+-+-+-+-+-+-+-+-+-+-+-+-+-+-+-+-+-+-+-+-+-+-+-+-+
| option-len=18                 |
+-+-+-+-+-+-+-+-+-+-+-+-+-+-+-+-+
|                   Database Download Server Address             |
|                                                                |
|                               +-+-+-+-+-+-+-+-+-+-+-+-+-+-+-+-+
|                               |            DB Server Port      |
+-+-+-+-+-+-+-+-+-+-+-+-+-+-+-+-+-+-+-+-+-+-+-+-+-+-+-+-+-+-+-+-+
|  OAM-SYSTEM-SERVER            |        option-len = 18         |
+-+-+-+-+-+-+-+-+-+-+-+-+-+-+-+-+-+-+-+-+-+-+-+-+-+-+-+-+-+-+-+-+
|                      oam server address                        |
|                                                                |
|                                                                |
|                                                                |
+-+-+-+-+-+-+-+-+-+-+-+-+-+-+-+-+-+-+-+-+-+-+-+-+-+-+-+-+-+-+-+-+
| oam server port               |                               .
+-+-+-+-+-+-+-+-+-+-+-+-+-+-+-+-+                               .
                                                                .
.
.
.
+-+-+-+-+-+-+-+-+-+-+-+-+-+-+-+-+-+-+-+-+-+-+-+-+-+-+-+-+-+-+-+-+
```

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    60         |    len = 6    |       enterprise number       |
+-+-+-+-+-+-+-+-+-+-+-+-+-+-+-+-+-+-+-+-+-+-+-+-+-+-+-+-+-+-+-+-+
| enterprise number ctd.        |     release information       |
+-+-+-+-+-+-+-+-+-+-+-+-+-+-+-+-+-+-+-+-+-+-+-+-+-+-+-+-+-+-+-+-+
             702                              701
```

```
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
800─| OPTION_VENDOR_CLASS = 16 |         option-len = 6             |
   +-+-+-+-+-+-+-+-+-+-+-+-+-+-+-+-+-+-+-+-+-+-+-+-+-+-+-+-+-+-+-+-+
802─|                        enterprise-number                     |
   +-+-+-+-+-+-+-+-+-+-+-+-+-+-+-+-+-+-+-+-+-+-+-+-+-+-+-+-+-+-+-+-+
801─| release information           |
   +-+-+-+-+-+-+-+-+-+-+-+-+-+-+-+-+
```

INTEGRATION APPARATUS, COMMUNICATION NETWORK AND METHOD FOR INTEGRATING A NETWORK NODE INTO A COMMUNICATION NETWORK

CROSS-REFERENCE TO RELATED APPLICATIONS

This application relates to and claims priority from U.S. Patent Application Ser. No. 60/956,287 filed Aug. 16, 2007, U.S. Patent Application Ser. No. 60/975,945 filed Sep. 28, 2007, and U.S. Patent Application Ser. No. 60/978,960 filed Oct. 10, 2007, the entire disclosures of which are hereby incorporated herein by reference.

FIELD OF THE INVENTION

The present invention relates to telecommunication networks. In particular the present invention relates to an integration apparatus for integrating a network node into a communication network, a network node, a communication network, a method for integrating a network node into communication network, a method in a network node for integrating the network node into a communication network, a program element for integrating a network node into a communication network, a computer-readable medium for integrating a network node into a communication network and a use of a Dynamic Host Configuration Protocol (DHCP) protocol for controlling integrating a network node into a communication network.

BACKGROUND INFORMATION

A rollout of a new telecommunications network may be a task requiring a lot of manual intervention. In addition, when new network nodes are added to an operational network, a significant amount of manpower may be required since the new node may run integrated in the new network environment. The cost for a manual integration of a network node into a network may be a high portion of the total operational expenditure (OPEX) of an operator.

During installation of a network node into a network prior to the first installation and commissioning of the network node, the node and corresponding OAM systems may be manually provided with a network address, a site- and operator-specific software, and a site- and an operator-specific configuration data. Since the node may usually not be delivered to the installation site with the appropriate addresses, software and configuration data this installation may be done by the field personnel on site, e.g., by using a Local Maintenance Terminal attached to the network node. Tests may also be performed and thus, the field personal installing a network node may be highly qualified personal.

Installing a network node may consume a significant amount of time of highly qualified personal.

The IETF (Internet Engineering Task Force) RFC (Request for Comment) 2132, "DHCP Options and BOOTP Vendor Extensions", March 1997, specifies a set of DHCP options.

The IETF RFC2131, "Dynamic Host Configuration Protocol", March 1997, describes a framework for passing configuration information to hosts on a TCP/IP network.

The IETF RFC3315, "Dynamic Host Configuration Protocol for IPv6 (DHCPv6)", July 2003, describes enabling of DHCP servers to pass configuration parameters such as IPv6 network addresses to IPv6 nodes.

The $3^{rd}$ Generation Partnership Project Technical Specification 3GPP TS 32.501, Technical Specification Group Services and System Aspects, Telecommunication management, "Self Establishment of eNodeBs (SEe); Concept and Requirements", Release 8, 2008 July, describes concepts how self-establishment works.

The $3^{rd}$ Generation Partnership Project Technical Specification 3GPP TS 32.501, Technical Specification Group Services and System Aspects, Telecommunication management, "Generic Integration Reference Point (IRP) management; Requirements", Release 7, 2007 June, defines a common service supported by all IRPs.

The document "Next Generation Mobile Networks", by Board of NGMN limited, White Paper V3.0, 5 Dec. 2006, identifies self-configuration as reducing costs and simplifying the installation procedures.

Number Resources, such as international enterprise numbers, are coordinated by the Internet Assign Numbers Authority (IANA), http://www.iana.org.

SUMMARY OF EXEMPLARY EMBODIMENTS OF THE INVENTION

According to an exemplary embodiment of the present invention, an integration apparatus for integrating a network node into a communication network, a network node, a communication network, a method for integrating a network node into a communication network, a method in a network node for integrating the network node into a communication network, a program element for integrating a network node into a communication network, a computer-readable medium for integrating a network node into a communication network and a use of a DHCP protocol for controlling integrating a network node into a communication network may be provided.

According to an exemplary embodiment of the present invention, an integration apparatus for integrating a network node into a communication network may be provided. The integration apparatus may comprise a monitoring device, a policy device, an identifying manager device, a linking manager device and a commissioning manager device.

The monitoring device may be adapted to detect activating or the activation of the network node within the communication network. The identifying manager device may be adapted to identify the activated network node and the identifying manager device may further be adapted to receive a policy from the policy device, which policy may be adapted to allow integrating the identified network node into the communication network. The identifying manager device may receive the policy from the policy device by requesting the policy from the policy device. In an example the identifying manager device may allocate a network address for the network node.

For example, the linking manager device may be adapted to establish a link between the network node and at least the integration apparatus. In a further example the linking manager device may be adapted to establish a link between a neighbour node of the network node and the network node.

The commissioning manager device may be adapted to use the link which may have been established between the integration apparatus and the network node, to configure the network node in accordance with the policy.

Thus, a network node may more efficiently be integrated into a communication network.

According to another exemplary embodiment of the present invention, a network node may be provided. The network node may comprise an identifying agent device, a linking agent device and a commissioning agent device. These agent devices may be devices associated with corresponding manager devices of an integration apparatus.

The identifying agent device may be adapted to announce the network node to an integration apparatus, i.e. the identifying agent device may provide an identification of the network node to the integration apparatus.

The linking agent device may be adapted to establish a link between the network node and at least the integration apparatus. In a particular example the linking agent device may also be adapted to establish the link between the network node and a neighbour network node.

The commissioning agent device may be adapted to receive commissioning information from the integration apparatus. Commissioning information may be software for running the network node or configuration parameter.

According to yet another exemplary embodiment of the present invention, a communication network may be provided. The communication network may comprise a plurality of network nodes, i.e. at least one network node according to the invention. The at least on network node may be connected to at least one further network node or to a plurality of network nodes. Thus, the network nodes may be connected.

The connection and/or the connections between the plurality of network nodes may have been established by using the integration apparatus according to the invention.

The fact that the connections may have been established by using the integration apparatus may be detectable by detecting links which may be connected to the integration apparatus from the network nodes or by the fact that if an integration apparatus may be connected to the communication network, the plurality of network nodes may try to set up a link between a network node and the integration apparatus.

According to another exemplary embodiment of the present invention, a method for integrating a network node into a communication network may be provided. The method may comprise detecting activating of the network node within the communication network. E.g., the powering, the activation or switching on of the network node may be detected.

Furthermore, the activated network node may be identified, e.g., by an integration apparatus. For identifying the network node in the integration apparatus, the integration apparatus may provide a network address to the network node.

Furthermore, the method may comprise receiving a policy, which policy may be adapted to allow integrating the network node into the communication network.

The method may further comprise establishing a link between the network node and an integration apparatus and using this established link to configure the network node in accordance with the policy.

According to another exemplary embodiment of the present invention, a method in a network node may be provided for integrating the network node into a communication network. The method in the network node may comprise announcing the network node to an integration apparatus, in order to allow the integration apparatus to identify the network node. The method further may comprise establishing a link between the network node and at least the integration apparatus. Furthermore, the method may comprise receiving commissioning information from the integration apparatus.

According to yet another exemplary embodiment of the present invention, a program element for integrating a network node into a communication network may be provided, which program element when being executed by a processor may be adapted to execute at least a method for integrating a network node into a communication network and/or a method in a network node for integrating the network node into a communication network.

According to another exemplary embodiment of the present invention, a computer-readable medium for integrating the network node into a communication network may be provided comprising a program, which program, when being executed by a processor may be adapted to execute a method for integrating a network node into a communication network and/or a method in a network node for integrating the network node into a communication network.

A computer-readable medium may be a floppy disk, a hard disk, an USB (Universal Serial Bus) storage device, a RAM (Random Access Memory), a ROM (read only memory) and an EPROM (Erasable Programmable Read Only Memory). A computer readable medium may also be a data communication network, e.g., the Internet, which allows downloading a program code.

The inventive integration apparatus and the inventive network node may allow an operational personal to quickly install a network node since the operational personal may substantially only need to physically install the network node in the site.

According to yet another embodiment of the present invention, a use of a DHCP protocol for controlling integrating a network node into a communication network may be provided.

This may include using DHCP for no-IP configuration parameters, such as policies or network addresses into DHCP server.

A manger device may be associated with an agent device. Thus, a management device in the integration apparatus, such as the identifying manager device, the linking manager device and the commissioning monitoring device may be an identifying server device, a linking server device and a commissioning server device, respectively.

Furthermore, the identifying agent device, the linking agent device and the commissioning agent device may be an identifying client device, a linking client device and a commissioning client device, respectively.

Manger and agent may be used as names and may mean the endpoints of an association. In other words, manager and agent may not limit the role of a corresponding device or function. Thus, a manager device may be a server device, a client device and/or a server and client device. Furthermore, an agent device may be a client device, but an agent device may also be a server device and/or a server and client device.

In the role of a server device and client device simultaneously, a manger device or a server device may trigger a corresponding operation and execute a corresponding operation. An operation may be a function of the corresponding device.

Physically installing a network node may comprise mounting the network node, cabling the network node, i.e. connecting the network node with power and with a network, and may comprise connecting an antenna.

After switching on the network node, the network node and/or an integration apparatus may perform self-configuring of the network node. In other words, once the network node may be switched on or powered on the network node and/or the integration apparatus, automatically commissioning the network node such, that the network node may become part of the communication network. The grade of automation may be selectable. The grade of automation may be substantially selected between fully automatically installing the node or interrupting an automatic installation process on predefined stages of the self-configuring method, i.e. for example by setting predefined stop points.

Thus, the network node may become OAM (Operation, Administration and Maintenance) connected. OAM connected may mean that a link between the network node and an OAM system may be established and that it may be possible to transmit data. The integration apparatus may also be an OAM system to which an OAM connected network node may be connected.

OAM connecting a network node may be a prerequisite to make the network node manageable. In addition to being OAM connected a manageable network node may be configured and this configuration may be modified. A network node may become configured by providing a configuration for the network node, which may be individual for a specific network node. A manageable network node may also allow to modify the configuration, however a manageable network node, which may only be OAM connected may not be running in the operational network. In other words, a manageable network node may not yet carry substantially payload traffic. However, a management link to the network node may be established and may be up and running.

An operational network node may work in the function for which function the network node may be designated. Thus, an operational network node may have a designated function or role in an operational network and may carry traffic. Thus, e.g., an operational base station or an operational eNodeB may transmit information and signals and may also handover radio connections.

After a physical installation of a new network node some steps may have to be conducted in order to make the new network node operational. For example, an address or a network address may have to be allocated to the new network node or node.

The network node may also have to be provided with basic information about the transport network environment of the network node. For example, the network node may need to know information about neighbours which the network node may have in the network. An example for such a neighbour may be a gateway, which may give the network node the possibility to send unrecognized traffic to. Furthermore, the network node may need the information about the transport network environment in order to know how to reach a particular neighbour, which the network node may want to communicate to or to connect to.

The network node may also have to be provided with the address of an OAM/OSS (Operation, Administration, Maintenance/Operation Support System) system which the network node may relate to. In an example the network node may have to be provided with the address of a part of the OSS which may provide support for the self-configuration process.

Furthermore, a network node may have to connect to the OAM/OSS system or the part of the OSS providing support for the self-configuration process, by using the address of the network node, the basic information about the transport network environment and the address of the OAM/OSS or the part of the OSS.

The network node may also have to provide some information to the OAM system about the identity of the network node, about the hardware configuration of the network node etc. For example, the network node may have to announce an ID, a property of the network node or configuration information of the corresponding network node.

This announced information, which may identify the network node may allow an internal function of the OAM or of the integration apparatus to determine the software, the configuration or other parameters, which may have to be downloaded into the network node. The announcement or announcing the information about the network node may also allow an inventory system of the communication network or an inventory system in the OSS to have the information, that a new network node may be in the field or in the communication network. Thus the inventory system may allow to provide an overview of the actual status and configuration of the network. Self-configuration may allow to provide an update of an inventory system in fast repetition cycles, i.e. with a high update rate.

The policy device may facilitate setting policies for all functions which can be executed after the network node or eNB may have established OAM connectivity. In other words, the identifying manager device may be excluded from receiving a policy since the identifying manager device may be used for identifying a network node.

Configuration data may be necessary in order to configure the network node such, that the network node may perform a predefined function within the communication network. The configuration data for the network node should be made available by either preparing the configuration or convert existing configuration data. In other words, the off-line generated configuration data for a network node may have to be made available either in the moment when the network node may require the configuration data or the configuration data may be prepared online and downloaded to the network node in the moment, when the network node requires the configuration data.

In the case of an amended network environment, the network node may have to be provided with new configuration data. In another example the network node may have to make the configuration data of the network node available. Therefore, the network node may prepare the configuration data or may extract the configuration data from a database of the network node or the network node may make prepared configuration data available.

Dependent network nodes can be updated with new configuration data as well. In other words, if the integration of the network node into the communication network may influence dependent nodes, these dependent nodes may also have to be updated with a new configuration, whereas the new configuration may take into account amendments which may have to be conducted as a consequence of installing the new network node into the communication network.

Thus, the network node may be connected to the OAM system and may be configured or manageable. Network nodes which are dependent of the network node or dependent network nodes may be updated with a new configuration as well and the new node may start to carry traffic and may enter the operational state. In this state the communication network may be in a stable condition, since no amendments may be performed within the network.

In other words, when a new network node may have to be integrated into the network this may lead to an unstable condition. However, automatically integrating the network node or the self-configuration process may allow the communication network on its own to handle the integration of the network and may solve unstable conditions automatically. Thus, in one example substantially no external or manual interruption may have to be performed in order to bring the new network into the communication network node and keep the network up and running.

A physical installed node which may have a basic address information about its transport network environment, an address of an OAM/OSS system, an identity of the network node which may be known in an inventory system may be connected to the OAM system and may be configurable or manageable When a node may become fully operational, the node may carry traffic.

It may be seen as an idea of the invention to reduce the intervention by a field personal, i.e. manual intervention, during a network node installation method or process. By reducing the manual intervention in a process of adding a new network node into a communication network the OPEX (Operational Expenditure) may be reduced. Self-configuration and automatically adding a new network node may be provided by a functional architecture as provided with this invention. This functional architecture may comprise logical functional blocks or a plurality of devices such as a monitoring device, policy device, an identifying manager device, a linking manager device and a commissioning manager device. These devices may be realized as hardware, as function or as software which may run by a processor or as objects. The devices may conduct a certain functionality or a logical function. Thus, the terms device and function may substantially equally used.

An integration apparatus may use such a functional architecture. This functional architecture may allow automation of the installation steps, which may be required after the physical installation of a network node in a site, and before the network node may become operational.

The phase or stage between physical installation and becoming operational of a network node may be called the commissioning phase or stage.

The integration apparatus, in particular a generic description of the functional blocks of the proposed architecture may allow for integration of a configuration management tool chain in self-configuration, which tool chain may be available in the OSS of a network operator.

Possible interactions between logical blocks or devices, may be that terminating the execution of one function may trigger the execution of another function.

In one example, a DHCP protocol may be used in order to support the self-configuration of a network node or self-configuring of a network node.

As part of the self-configuration process of a network node, some typical steps may be identified. Self-configuration may be conducted for a newly installed node but it may also be executed at every boot time of a network node, e.g., maybe when a node has been relocated or has been crashed.

In particular for a newly installed network equipment or network node, an address may have to be allocated to the network equipment, NE or network node. The network node may have to be provided with basic information about the transport network environment of the network node and the network node may also have to be provided with the address of the OAM/OSS system or of the part of the OAM/OSS system which part may provide support for the self-configuration process to which the node may have to be connected.

After providing address information and information about the transport network environment of a network node, software may be downloaded into the network node. Furthermore, configuration data may be downloaded into the network node.

The software download and configuration data download may be carried out from different OAM/OSS systems, e.g., software download may not be carried out by the same OAM/OSS system as configuration data download. The software download and configuration data download may be made by a subsystem, e.g., by a subsystem of an OAM/OSS system. In order to allow different systems or subsystems to download software or configuration data, the network node may have to be provided with information, such as IP (Internet protocol) network addresses or other information of these subsystems.

Subsystems of the OAM/OSS system may be a software download manager, a configuration data download manager, a network gateway or other services.

Optionally additional information, which may be used for the network node configuration may be assigned, for example information about other network nodes to which other network nodes the self-configuring node should connect to.

As an example for a 3G LTE/SAE (Third Generation Long-Term Evolution/System Architecture Evolution) such information may be the address or the addresses of associated aGW (Access Gateway) nodes comprising an MME (Mobile Management Entity) and an SAE-Gateway (System Architecture Evolution-Gateway), which are required for establishing an S1 interface. The S1 interface may provide access to evolve RAN (Radio Access Network) resources for the transport of user plane and control plane traffic.

Furthermore, the addresses of neighbouring nodes or other eNodeBs may be provided which may be required for the establishment of the x2-interface. The x2-interface may be an interface between different eNodeBs.

In a high level self-configuring architecture which may be comprised in an integration apparatus, the functionality of providing addresses or basic information, for example for the transport network environment or for OAM/OSS systems may be located in an address allocation function (AAF) and in the OAM connectivity establishment function (OAM CO_EF or CO_EF). Using DHCP (Dynamic Host Configuration Protocol) may allow realizing AAF and OAM CO_EF.

One example for an identifier, e.g., for ensuring that the OAM system may identify a network node correctly, may be a hardware (HW) address, an operator specific node identifier etc. The identifier data may allow the OAM to identify the network node correctly. For providing a network identifier, a manufacturer and a network operator can exchange some identifier data (e.g., hardware address, operator specific node identifiers, etc.) prior to the installation procedure and prior to the commissioning procedure.

According to another exemplary embodiment of the present invention, the identifying manager device may further comprise an address allocation function (AAF), wherein the address allocation function may be adapted to provide basic configuration parameters to the network node.

By providing basic configuration parameters from the integration apparatus to the network node information may be transmitted to the network node which may be used by the network node for self-configuring the network node.

The AAF may allocate a network address to the network node in order to identify the network node.

According to another exemplary embodiment of the present invention, the basic configuration parameter may comprise a control information for controlling inside the network node automated integration of the network node into the communication network.

Providing a control information to the network node may facilitate the integration apparatus to control the network node which network node may be integrated into the communication network. The integration apparatus may provide the network node with information or with program code which information may allow the network node to conduct subsequent steps of the self-configuring the network node. The information provided by the integration apparatus to the network node may comprise tailored information for the network node. In other words, the integration apparatus may provide information to the network node which information may be determined by a policy within the integration apparatus. This policy may comprise rules, which rules may control the network node such, that the network node may be integrated in the network.

Thus, the network node may also, independently from the integration apparatus, conduct the steps for self-configuring the network node in the network. Therefore, by providing the information for the next steps the integration apparatus may give control to the network node to integrate the network node into the communication network.

The basic configuration parameter or the control information may comprise a list of network addresses of network managers, from which managers the network node may receive information for self-configuring the network node. For example, the basic configuration parameter may comprise an address of the OAM/OSS system or addresses of neighbour transport network environment.

In another exemplary embodiment, the control information may comprise an address and/or a port of a software download server (SW_server), a database download server (DB_server) or an OAM-system-server (OAM system). Thus, the network node may receive information about the steps which the network node may have to conduct for self-configuration. For example, the network node may have to connect to the OAM server in order to establish a management link and to a database server in order to receive configuration data and to a software download server, in order to download the appropriate software. These may be steps, which may be determined by the policy device for that particular network node.

According to yet another exemplary embodiment of the present invention, the address allocation function may further be adapted to use the DHCP protocol for providing the basic configuration parameter.

Using a DHCP protocol may allow integration into an IP environment. DHCP may be a reliable mechanism to distribute a network address for network node. In an example the DHCP protocol may be used in order to distribute address information for remote server to the network node. In other words, the network node may not only receive the IP address or a network address of the network node. In addition to the address of the network node the network node may also receive an address, a plurality of addresses or a list of addresses of servers which the network node may have to connect to in order to conduct self-configuration. In a particular example the list may have an order wherein the order of the list may provide the order of steps the network node may have to conduct in order to be integrated into the network. The collection of information which may be transmitted using the DHCP protocol to the network node may be determined by a policy within the integration apparatus. Thus, the information provided by the DHCP protocol, in particular the control information may depend on the identified network node. The information may also depend on a type of identified network node.

According to another exemplary embodiment of the present invention, the integration apparatus may further be adapted to control automated integration of the network node into the communication network.

By providing address information or information about the next steps to the network node may make the network node independent from the integration apparatus in order to self-configure the network node. However, in another example the integration apparatus still controls the steps of a self-configuring the network node. In other words, a central controller may survey or may monitor the installation and integration of the network node in the network.

According to another exemplary embodiment of the present invention, for controlling the self configuration process or the integration of the network node or the automated integration, the integration apparatus may comprise a controller device. The controller device may be adapted to control automated integration of the network node into the communication network.

The controller device may be integrated in the integration apparatus or the OAM/OSS. Thus, the controller device may allow for a centrally controlling of the integration of a network node into a network. In an example the controller device may be a workflow engine.

According to another exemplary embodiment of the present invention, the commissioning manager device may further comprise a software download function. The software download function may be adapted to download software to the network node in accordance with the policy.

Furthermore, the software which may be downloaded to the network node may depend on the identified network node and in particular on a type of the identified network node. The software download function may facilitate a control the software version to be provided to a particular type of network nodes or network elements within the network. For example, an eNodeB of a particular network provider may be restricted to only employ a software release or firmware which may be tested as stable. Thus, a network operator may provide frame conditions or the framework within which framework the integration apparatus may decide on its own about steps and parameters for self-integrating of the network node.

According to yet another exemplary embodiment of the present invention, the commissioning manager device may further comprise a network planning function.

The network planning function may also be automated during a self-configuration process. In other words, this may mean that installing a network node within a network may not only require to commissioning or configuring this particular added network node. The new installed network node may also influence or affect an existing communication network. For example, a newly installed eNodeB may amend a distribution of frequencies used in order to communicate with mobile terminals or end user terminals. Thus installing a new eNodeB within an existing mobile network may mean providing an additional cell in the mobile network. Thus, the coverage of cells in a close environment of the added eNodeB may be amended as well.

By providing a planning functionality a closed loop may be established to allow the integration apparatus to monitor the impact of amendments concerning the complete communication network.

In another exemplary embodiment of the present invention, a neighbour relationship between networks nodes may have to be amended as a consequence of newly installing a network node. The network planning may comprise radio network planning or transport network planning. For example, an addition of a network node may also mean allocating a transport channel or a plurality of transport channels within a transport network. Thus, providing a planning function in the integration apparatus may also facilitate an automatically allocation of network resources, such as channels in the transport network.

According to another exemplary embodiment of the present invention, the network planning function may be at least one of an online network planning function and/or an offline network planning function.

An online network planning function may facilitate a substantially immediately reaction to amendments concerning the communication network. Thus an online planning function may allow automatically react to amendments caused by installing a new network equipment to the communication network.

Offline network planning may facilitate a controlled high level planning and may provide static parameters of a network, which may not be amended.

According to another exemplary embodiment of the present invention, the commissioning manager device may further comprise an inventory device, such as a database, wherein the commissioning manager device may be adapted to keep the network inventory device up to date with a communication network configuration.

An inventory device providing a projection of a physical existing network may facilitate a network provider or a network operator to easily obtain an overview of the actual configuration of a communication network. The inventory device may allow administrating statistical data of the network, such as the number of network nodes installed within the network or actual software versions installed on a certain network element.

According to another exemplary embodiment of the present invention, the policy, which may be adapted to facilitate integrating the identified network node into the communication network may comprise a list of network addresses.

For example, the network addresses comprise the address or port number of a software download server, a database download server or an OAM system server.

According to another exemplary embodiment of the present invention, the network node further comprises a controller device, whereas the controller device may be adapted to receive control information from the integration apparatus for controlling inside the network node an automated integration of the network node in a communication network.

The controller device within the network node may facilitate receiving the basic configuration parameter or control information provided by the integration apparatus. The controller may also allow autarkicly, e.g., without further influence or impact of the integration apparatus, self-configuring the network node by the network node.

According to yet another exemplary embodiment of the present invention, the controller device in the network node may be adapted to receive control information using a DHCP protocol.

Thus, the network node may receive the address or the port number of corresponding servers by using the DHCP protocol.

Exemplary embodiments of the present invention and aspects of the invention have been described with reference to different subject-matters. In particular, some embodiments have been described with reference to apparatus type claims whereas other embodiments have been described with reference to method type claims. However, a person skilled in the art will gather from the above and the following description that unless other notified in addition to any combination between features belonging to one type of subject-matter also any combination between features relating to different subject-matters in particular between features of the apparatus claims and the features of the method claims may be considered to be disclosed with this application.

These and other objects, aspects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 3 is a DHCP V4 private use option tag structure for providing software download server information according to an exemplary embodiment of the present invention;

FIG. 4 is the DHCP V4 private use option tag structure for providing database download server information according to another exemplary embodiment of the present invention;

FIG. 5 is a vendor-specific information option of DHCP V4 for a basic configuration parameter distribution according to an exemplary embodiment of the present invention;

FIG. 6 is a vendor-specific information option of DHCP V6 for the basic configuration parameter distribution according to another exemplary embodiment of the present invention;

FIG. 7 is a DHCP V4 vendor class identifier option field for a release control according to an exemplary embodiment of the present invention.

Figure 1:
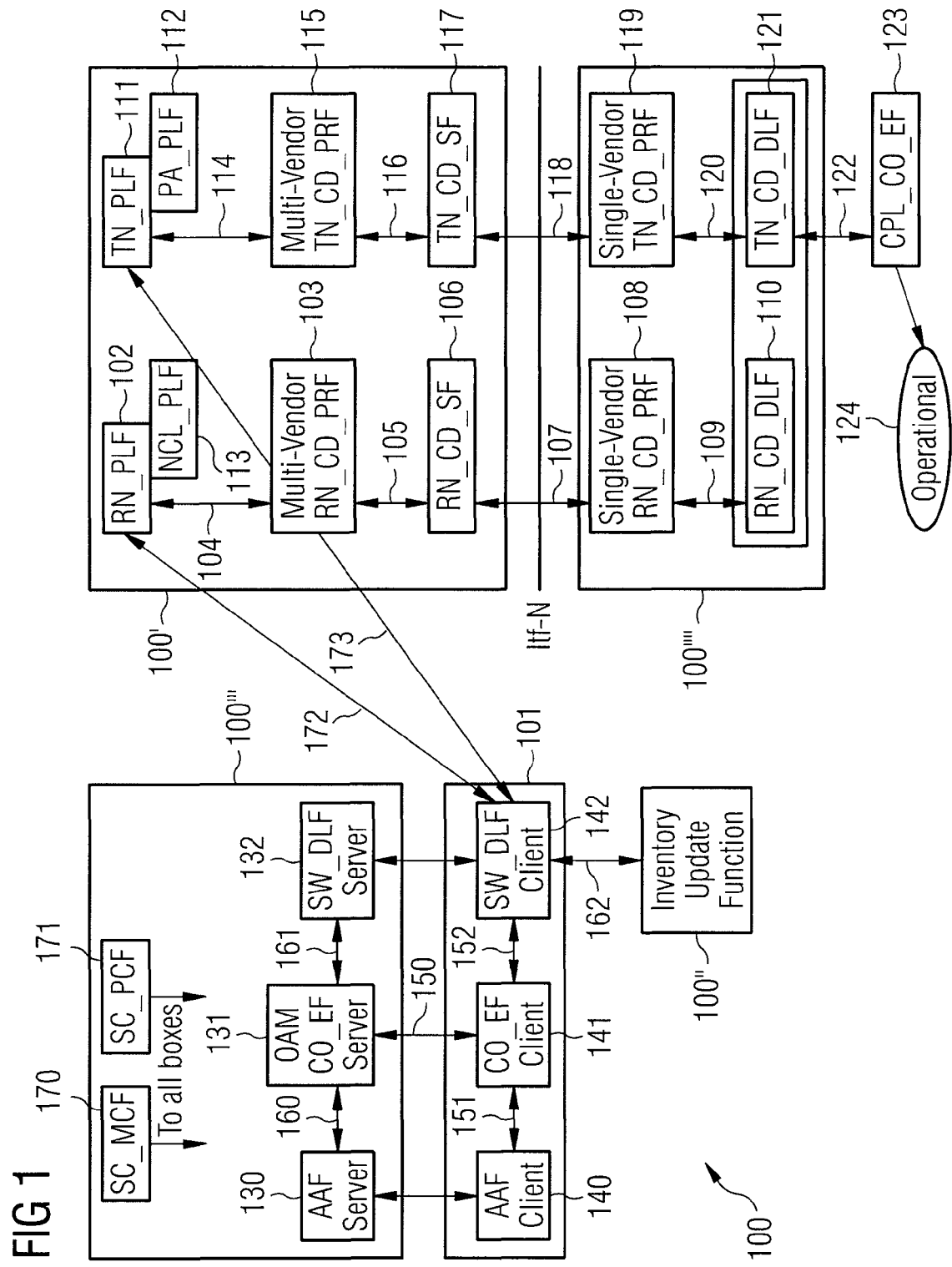
FIG. 1 is a block diagram of an integration apparatus and a network node in an online planning scenario according to an exemplary embodiment of the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention.

DETAILED DESCRIPTION OF EXEMPLARY EMBODIMENTS

FIG. 1 shows a block diagram of an integration apparatus 100 and a network node 101 according to an exemplary embodiment of the present invention.

In FIG. 1 the integration apparatus 100 is shown as a distributed system architecture. A distributed architecture means that different functions of the integrator apparatus may be distributed on different physical hardware platforms. The integration apparatus 100 comprises the network planning device 100', 100"", comprising the network planning tool chain or data preparation tool chain, the inventory device 100" and the self-configuration device 100'''. The different devices 100', 100", 100''' and 100"" may form a functional architecture and comprise numerous logical functions. Some of the logical functions support the self-configuration process.

A function may be a hardware device performing a predefined task or function or a software module executed by a processor which also provides a predefined task or function.

The network planning function 100' or the network planning device 100' may comprise OSS functionality of a network operator.

The network planning device 100' comprises a radio network planning function 102 (RN_PLF). The radio network planning function provides a radio network plan.

The radio network plan features some basic configuration parameters for the radio network. The radio network planning function 102 provides basic configuration parameters which may be used as a policy and which may be provided to a network node 101 to be installed. Before the configuration parameters can be provided to a network node, they may have to be transformed, e.g., in commands for element manager (EM).

The radio network planning function may comprise planning of a neighbour cell list (NCL_PLF) 113 in the neighbour cell list planning function 113. A neighbour cell list is a plan defining neighbour relations between network nodes forming the communication network. The neighbour cell list may comprise information such as which network node 101 is connected to which other network node 101.

The exemplary network planning can be initiated by receiving a trigger from the network node 101 via link 172. This trigger in an example may be conducted immediately after software download 142.

The exemplary network planning device 100' or network planning function 100' can also comprise the multivendor radio network configuration data preparation function (RN_CD_PRF) 103. The RN_CD_PRF adds some additional configuration parameters to the radio network plan, wherein the radio network plan is provided via the link 104 from the RN_PLF to the RN_CD_PRF. The added configuration parameters may be, for example, vendor-specific configuration parameters. For example, each network node has vendor-specific radio configuration parameters which are only used by a certain vendor and which may not have any function in the definition of another vendor.

Combining the basic configuration parameters of the RN_PLF and the RN_CD_PRF may generate a list of basic configuration parameters which list is provided via the link 105 to the radio network configuration data splitter function (RN_CD_SF).

The configuration data provided as output by the RN_CD_PRF can comprise data which is not only associated with newly installed node. The configuration data provided by the RN_CD_PRF may also comprise data for dependent nodes, the configuration of which may have to be updated due to the insertion of a new network node in a communication network. If the dependent nodes are managed by different element managers (EM) the configuration data needs to be split into the part for every EM. Therefore, the RN_CD_SF 106 determines on an element manager level, which element manager, in particular which specific node information in element managers, has to be amended in response to the addition of a new network node in an existing communication network.

This split information generated by RN_CD_SF 106 can be provided to the single vendor radio network configuration data preparation function (RN_CD_PRF) 108 via the network interface LTF-N 107.

The RN_CD_PRF 108 function can add very detailed vendor-specific parameters to the basic configuration parameter list. For example, the RN_CD_PRF 108 can add low level information such as hardware-related parameters to the configuration data or to the basic configuration parameter list. The output of the RN_CD_PRF function 108, which is provided at the interface 109 has the entire configuration data required to configure the network nodes 101 of the communication networks. In other words, the configuration data comprise all configuration data for all network nodes to which the addition of a new network node may have an impact.

After the configuration data is completely prepared and provided at link 109, it can be downloaded into the corresponding network nodes. Thus, the configuration data should be downloaded to each network node 101 which may be affected by the addition of the new network node. This download can be made by the radio network configuration data download function (RN_CD_DLF) 110.

Thus, beginning with the radio network planning function 102 which may be on a higher layer then the RN_CD_PRF function 108, the granularity of the information may be increased. Thus, in the RN_CD_DLF function 110 detailed information about configuration of specific parameters in the affected network nodes is available.

A similar generation of basic configuration parameters may be conducted for transport network planning.

Transport network planning starts with the high level transport network planning function (TN_PLF) 111. The TN_PLF 111 function provides a transport network plan which may be a network diagram showing network nodes of the transport network. This transport network plan features some basic configuration parameters for the transport network. For example, the transport network plan comparable to the radio network plan may provide high level parameter for transport network planning. In other words, the transport network plan likely only provides an overview which network node is connected to which other network node without specifying details of a configuration such as which parameter is configured in which way. The transport network plan 111 may include the planning of pool areas (PA). The function of planning of pool areas is shown as PA_PLF 112 (pool area planning function). A pool area is a number of MMEs which commonly serve an eNodeB. Thus, an eNodeB may have a plurality, e.g., n, S1 connections to the corresponding number of n MMEs and can flexibly route calls to the MMEs. The MME building this pool of n MMEs can be defined during pool area planning.

The link 114 connects the TN_PLF 111 with the multi-vendor transport configuration data preparation function (TN_CD_PRF) 115. The TN_CD_PRF can add a certain additional configuration parameter to the transport network plan, e.g., the TN_CD_PRF may add a certain further detailed configuration parameter to a configuration parameter list concerning transport network planning.

This configuration parameter list is provided via the link 116 to a lower function, the transport network configuration data splitter function (TN_CD_SF) 117. The configuration data provided as output by the TN_CD_PRF 115 can comprise data not only for the newly installed node, but also for dependent nodes, the configuration of which has to be updated caused by the insertion of the new network node 101. In other words, integration, an insertion or addition of a new network node 101 into the communication network may have an impact on other network nodes, already being integrated into the communication network.

Thus, the addition of a new network node may generate instability within the network which may have to be brought into a stable status, i.e. a newly configured network. Thus, a communication network with an integration apparatus comprising planning functionality may be a self-organizing network, which also can react to instabilities like addition of new network nodes.

Some network nodes may depend on the addition of a new network node. This can mean that the dependent network nodes are impacted or affected by the addition of a new network node. If the dependent nodes or the dependent network nodes are managed by different element manager, the configuration data needs to be split into the part of every element manager. This can mean that the configuration for each element manager has to be generated associated with the addition of the network node.

Via the network management interface Itf-N 118, the output of the TN_CD_SF 117 should be provided to the single vendor transport network configuration data preparation function (TN_CD_PRF) 119.

The TN_CD_PRF function 119 can add certain detailed vendor-specific parameters, such as, e.g., hardware-related parameter, to the configuration data or to the list of configuration data. The output of the TN_CD_PRF on link 120 may include substantially the entire configuration data available, which may be preferable to configure the nodes. In other words, e.g., the list of configuration data or basic configuration parameters provided via link 120 may comprise the information which amendments have to be conducted as a response to the addition of a new network node on a configuration data layer. Thus, the configuration provided on interface 120 or link 120 may directly be provided to corresponding element manager in order to configure corresponding network equipment.

Such detailed vendor-specific parameters can be provided via link 120 to the transport network configuration data download function (TN_CD_DLF) 121. After the configuration data is completely prepared in the TN_CD_DLF 121, the configuration data can be downloaded into the corresponding network nodes 101. The TN_CD_DLF manages or administrates the download. In other words, the TN_CD_DLF can manage the configuration data or the basic configuration parameters to be distributed to the correct corresponding element managers.

Via link 122, the configuration data can be downloaded to the call processing link connectivity establishment function 123.

The call processing link connectivity establishment function (CPL CO_EF) 123 may establish the links used for call processing between different network nodes 101. For example, in an LTE/SAE network the links used for call processing between different network nodes are the S1-link and the X2-link. In other words, the CPL_CO_EF 123 may generate the links between different network nodes of a communication network. The OAM_CO_EF establishes connectivity to the OAM system. The connectivity to the OAM system can be used for providing further information. This information can be used by the CPL CO_EF for establishing the call processing interfaces.

After downloading the configuration parameter to the element manager and via the element manager to the corresponding network nodes, the generated network configuration can become operational, as shown in FIG. 1 as a function 124.

The self-configuration device 100''' and the inventory update device 100" are now described, which can also be part of the functional architecture 100 as shown in FIG. 1. The self-configuration device 100''' may be the core of the self-configuration process. For example, not all functions shown in FIG. 1 are required for self-configuration process. For example, the inventory update function or the inventory update device 100" may be omitted.

The self-configuration device 100''' can comprise the identifying server device 130 and/or the identifying manager device 130. The identifying server device 130 can comprise the address allocation function (AAF).

The AAF 130, 140 can allocate an address to a newly installed network equipment 101 or network node 101. This address can be an intermediate address that is only used during the self-configuration process or this address may also be the final address, which address is also used during normal operation after completion of the self-configuration process. This address may be an address provided by the NE 101 or base on an identifier provided by NE 101.

The AAF 130, 140 can be split into a client part 140 and a server part 130. The server part may be a part of the integration apparatus 100, whereas the client part may be located within the network node 101.

The OAM connectivity establishment function (OAM CO_EF) 131, 141 can provide to the newly installed NE 101 information about the transport network environment of the NE 101 that may be preferable for starting the communication with another entity. In other words, the OAM CO_EF 131, 141 or the linking server device 131 or the linking manager device 131 is adapted to establish a link between the network node 101 and at least the integration apparatus 100.

In FIG. 1, the OAM CO_EF server 131 or the linking server device 131 of the integration apparatus 100 can be connected by a link 150 to the OAM_CO_EF client 141 of the network node 101 or to the linking client device 141 or to the linking agent device 141 of the network node 101. The linking client device 141 provides a connection to the OAM and OSS via link 150 and via link 151 and 152 the linking client device 141 or OAM CO_EF also provides a connectivity to the AAF client 140 and the SW_DF client of the network node 101. The linking client device 141 may also provide connectivity to neighbours of the network node 101. The AAF client 140 may be a part of the identifying client device 140 or the identifying agent device 140.

In addition to such exemplary configuration and operation, the address of the OAM/OSS system, to which the node 101 shall connect, can be provided by the OAM CO_EF function in a single step process or in a multi-step process. The address of the OAM/OSS system may be used to connect the linking client device 141 to the linking server device 131 via the link 150. It may also be possible to split off the OAM CO_EF function 131, 141 of providing the address of the OAM/OSS system into a logical entity of its own. In other words, providing the address of the OAM/OSS system may be realized or may be implemented in a separate device.

When the network node 101 has the information provided by the OAM CO_EF function, the network node 101 can connect to the OAM system. The OAM_CO_EF can be split into a client part 141 and a server part 131.

The client server architecture may facilitate using DHCP to provide the node 101, in particular the linking client device 141 of the node 101 with the address of the OAM, OSS system (not shown in FIG. 1) to which the node 101 shall connect to.

The commissioning manager device 132, the commissioning server device 132, the software download function (SW_DLF) or SW_DF 132, 142 can be used to download software into the newly installed node 101. Selection of the appropriate software may require communicating some information about the node 101, such as node identity or the hardware configuration of the node 101.

Information about the node 101 may be provided to the self-configuration device 100''' via the identifying server device 130 or AAF server 130. The SW_DLF can also be split in a client part and a server part which may allow using a DHCP protocol for providing an address to the network node 101 of a software download server. A software download server or a software server may be a server which provides software for network node 101.

As can be seen in FIG. 1 the server part of AAF 130, the server part of OAM_CO_EF 131 and the server part of SW_DLF 132 are in a communication relation via the links 160 and 161. Similar links exist on network node 101.

On network node 101 the client part of AAF 140 can be connected to the client part of OAM_CO_EF 141 with a link 151 and the client part OAM_CO_EF is connected to SW_DLF client part 142 via link 152. These links between the server parts and client parts respectively may facilitate a determination of an order of commands. In other words, the termination of the execution of one function can trigger the execution of another function. For example, the termination of the execution of an AAF function 130, 140 triggers the execution of OAM_CO_EF function 131, 141. And the execution of the OAM_CO_EF function 131, 141 triggers the execution of the SW_DLF function 132. The SW_DLF client part may be part of the commissioning client device 142 or the commissioning agent device 142.

This exemplary order of the execution of the functions may be determined by the order of commands within a DHCP packet.

The inventory update function 100" or the inventory device 100" can be connected to the SW_DLF client 142 via link 162. The exemplary inventory update function 100" may be informed by the network node 101 after establishing connectivity 131, 141 and downloading software to the network node 101, 132, 142, for example via the link 162. Thus, the node 101 can inform the inventory system 100" or the inventory device 100" about the presence of the newly installed network node 101 in the field.

The integration apparatus 100 and in particular the self-configuration device 100''' may further comprise the self-configuration monitoring and control function SC_MCF 170 or the SC_MF 170. The SC_MCF is executed in the monitoring device 170. The SC_MCF monitors the self-configuration process and provides an operator (not shown in FIG. 1) with information about the self-configuration process.

The SC_MCF function 170 may be able to obtain information about all other functional blocks or devices. Thus, the SC_MCF has an overview about the self-configuration process and may provide this information to a network operator. In addition to getting information about the functions or devices of the network node 101 and of the integration apparatus 100 the SC_MCF 170 allows to control the execution of the self-configuration process.

The self-configuration policy control function (SC_PCF) 171 or the policy device 171 may be controlled via policies or rules that are configured into the policy device 171. The SC_PCF process may also be controlled via policies or rules that are configured into the corresponding functional blocks. The SC_PCF 171 may facilitate configuring the policies in the functional block. Furthermore, the SC_PCF 171 or the policy device 171 may facilitate to provide policies to the network node 101 in order to control the self-configuration process and self-configuring of network node 101.

The functional blocks supporting the self-configuration process in the self-configuration device 100''' and not being located in the NE 101, can constitute the self-configuration support system (SCSS) 100'''. The SCSS comprises the SC_MF 170, the SC_PCF 171, the MF 130, the OAM_CO_EF 131 or the OAM CO_EF 131 and the SW_DLF 132. The SCSS 100''' may be accessed via a single address or different addresses, for example different addresses allocated to the server parts 130, 131, 132.

The sequence of the execution of the functions or the devices in the self-configuration device 100''' or the SCSS 100''' can be changed in certain exemplary cases.

In an exemplary embodiment, the inventory update function 100" can be executed also at a later point in time and not directly after the software download with the commissioning client device 142 or the commissioning agent device 142.

In addition, the location of the splitter functions RN_CD_SF 106, TN_CD_SF, 117 can be changed in the configuration data preparation tool chain, represented by block 101' and 100''''.

Thus, the path from RN_PLF 102 to RN_CD_DLF 110 and the path from TN_PLF 111 to TN_CD_DLF 121 can form a configuration data preparation tool chain 100', 100''''. The arrows of links 104, 103, 105, 107, 109, 114, 116, 118, 120, and 122 should be considered as an example. The link between the functional blocks of the configuration data preparation tool chain 100'. 100'''' may be determined by policies provided by the policy device 171. Also interactions between functions that are not connected by arrows in FIG. 1 may be possible.

In FIG. 1, the SW_DLF 142 is shown as being connected by link 172 to the RN_PLF 102. And the SW_DLF is connected via link 173 to the TN_PLF 111. Thus, in FIG. 1 an online planning scenario is shown, which means that any amendment in the network reported via link 171 and 173 to the planning function 102, 111 may be immediately calculated and a new configuration is provided to the communication network.

The SC_MCF 170 and SC_PCF 171 can be connected to all devices ('to all boxes') 130, 131 and 132 in the self-configuration device 100'''. In other words, in the online planning scenario of FIG. 1, the SW_DLF is the last function or last device which is executed before via link 172 and/or link 173 the planning tool chain is triggered. However, as shown in FIG. 1, the blocks 100''' and 100' can be separate blocks, the content of which may be independent. Thus, e.g., the only relation between the block 100''' and 100' may be a trigger relation in order to start the planning tool chain. The flexibility of the exemplary solution may also facilitate another function, instead of the SW_DLF function being the last function which triggers the planning tool chain.

In order to get a substantially fully automated self-configuration process it may be necessary that the functional blocks 170, 171, 130, 131, 132, 140, 141, 152, 102, 111, 110, 121 may be executed in a predefined manner. For example, the interaction between the logical functions may be sequential. This means that the output of one device, 170, 171, 130, 131, 132, 140, 142, 141 is the input of another device.

In order to get a substantially fully automated self-configuration process it may be necessary that the sequential execution of these functional blocks is triggered.

A trigger can be a manual trigger or an automated trigger.

If each function is started manually, a manual trigger can be provided. Manual trigger may only be used by a local maintenance terminal, which can be directly connected to the network node 101, before an OAM connectivity is established, e.g., before the network node is OAM-connected. As soon as OAM connectivity is established, the control may be handed over to the SC_MCF 170 and automated self-configuring may be executed.

Using an automated trigger may mean that each functional block triggers the execution of another functional block and the complete self-configuration process may run in an automatic manner. In addition, for the configuration data preparation tool chain 100' and 100'''', certain type of an automatic triggering should be added. Triggering may mean, e.g., controlling an interaction or providing the "glue" between the functional blocks.

Possible realisation for such a sequence or "glue" between the functional blocks may include, e.g., providing commands in form of DHCP packets. A plurality of mechanism may be used in order to link the functional blocks together. Furthermore, other automated process chains like self-optimization of network nodes may be used.

Figure 2:
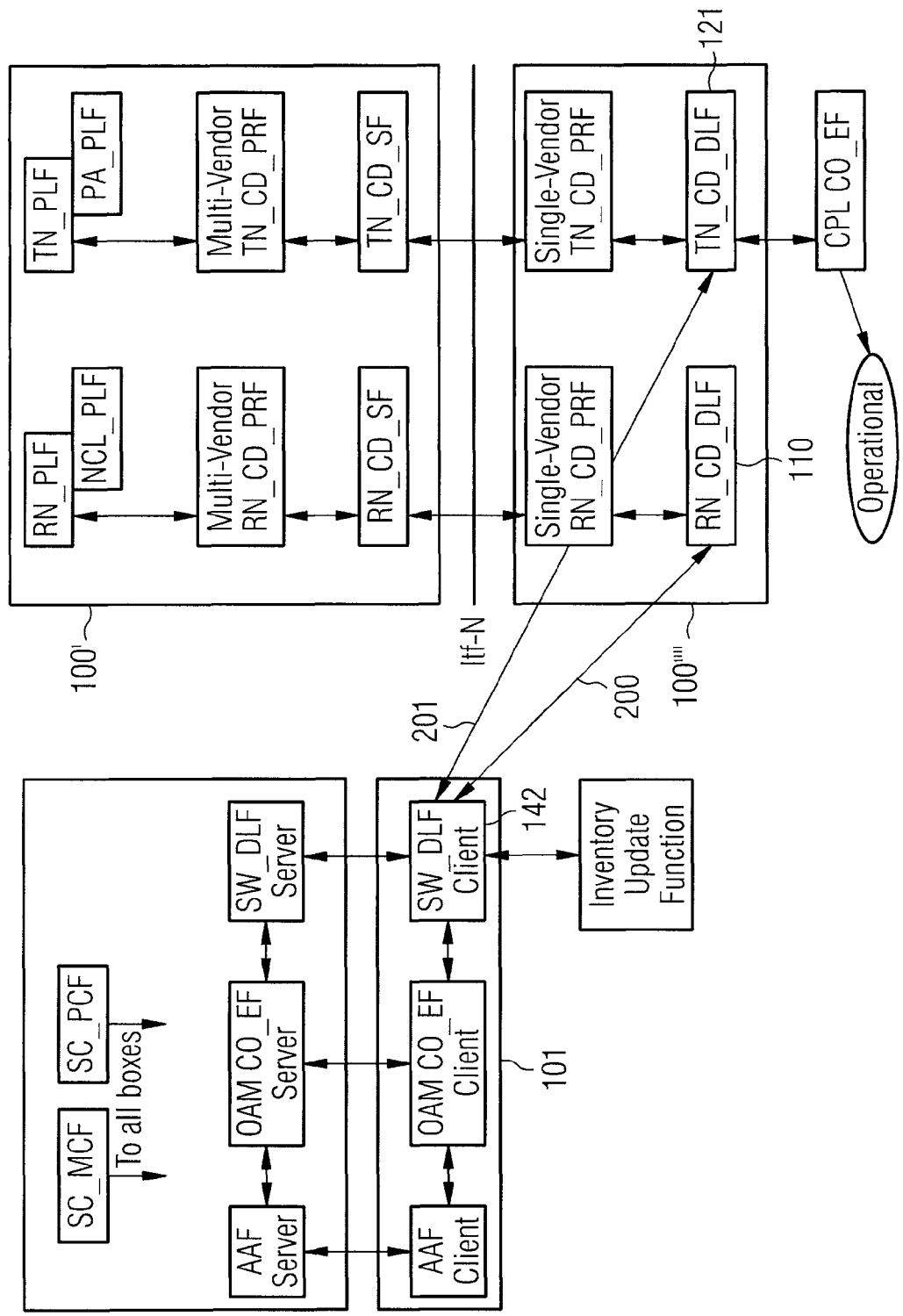
FIG. 2 is a block diagram of an integration apparatus and a network node in an offline planning scenario according to an exemplary embodiment of the present invention.

FIG. 2 shows a block diagram of the network scenario of FIG. 1 with the SW_DLF 142 of the network node 101 being connected via links 200 and 201 respectively to RN_CD_DLF 110 and TN_CD_DLF 121 according to an exemplary embodiment of the present invention. In the example shown in FIG. 2, an offline planning scenario is shown which means that via the data preparation tool chain 100', 100'' the configuration data 110, 121 is generated offline and provided to the SW_DLF. Thus, as shown in FIG. 2, the data preparation tool chain is likely not triggered by SW_DLF.

FIG. 1 and FIG. 2 show block diagrams of two possible exemplary deployment scenarios regarding the interaction between self-configuration functions SCSS 100''' and a network planning tool chain 100', 100''''.

For example, FIG. 1 shows a fully automated scenario or an online planning scenario, whereas each logical function triggers the execution of the next logical function. In FIG. 1, the configuration data preparation tool chains 100', 100'''' may be triggered from the self-configuration process. Thus, the entire configuration data preparation functions are integrated into the self-configuration process. FIG. 2, however, shows an exemplary scenario, where only the download of configuration data into the network nodes can be triggered within the self-configuration process 110, 121. However, the data for functions RN_CD_DLF and TN_CD_DLF may be prepared outside of the self-configuration process. Thus, the configuration data preparation tool chain 100', 100'''', e.g., the radio network planning or the transport network planning may be triggered and executed manually.

Other exemplary scenarios, where the configuration data preparation tool chain 102, 103, 106, 108, 110, 111, 115, 117, 119, 121 is only partly integrated into the self-configuration process are possible as well.

Thus, according to one exemplary embodiment of the present invention, it is possible to provide a network node 101, for example, an eNodeB 101, after physical installation into the operational state in an automated manner. For example, the IP network connectivity can exist between the network node 101 and the OAM system or the OAM subsystem, which OAM system may provide support for the self-configuration process.

Figures 8, 9:
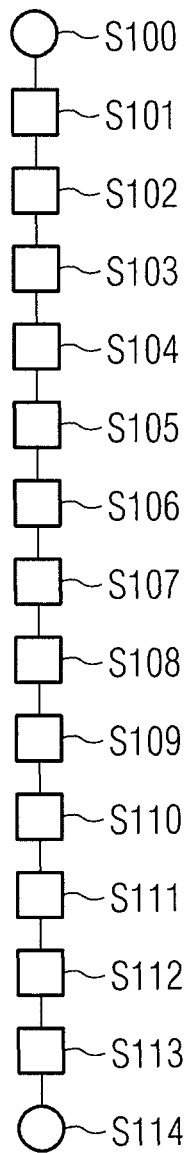
FIG. 8 is a DHCP V6 vendor class identifier option field for the release control according to another exemplary embodiment of the present invention.
FIG. 9 shows a flow diagram for an automated self-configuration method according to an exemplary embodiment of the present invention.

The eNodeB can be physically installed and physically connected to an IP network and the process begins when the field personal start the self-configuration process. It is also possible that the process is triggered automatically after the completion of an eNodeB self test for example. F FIG. 9 shows a flow diagram of an exemplary process of self-configuration according to an exemplary embodiment of the present invention. The process starts in step S100 which is an idle status. In step S101, an eNodeB IP address is allocated to the new eNodeB. Furthermore, basic information about the transport network, e.g., gateways, environment is provided to the eNodeB. With this exemplary information, the eNodeB can exchange IP packets with other Internet hosts.

In step S102, the eNodeB can provide information about its type, hardware and other relevant data about the eNodeB and delivers the information to the OAM system providing support for the self-configuration process. In step S103 the address or addresses of the OAM system which provides support for the self-configuration process, for example the subsystem for software download 132 or the subsystem for configuration data download is provided to the eNodeB. The address can be equal to an IP address and a port number or a DNS (Domain Name System) name and port number, or an URI (Uniform Resource Identifier).

In step S104, the address or addresses of the OAM system or subsystem providing support for normal OAM functions after completion of the self-configuration process may be provided to the eNodeB. The address can be equal to an IP address and a port number or a DNS name and a port number or an URI.

In step S105, the eNodeB can connect to the OAM system providing support for the software download and a decision which software or software package have to be downloaded to the eNodeB is taken. In step S106, the software is downloaded into the eNodeB 101. The eNodeB 101, can connect to the OAM system providing support for the configuration data download.

In step S107, the transport configuration data and radio configuration data 110, 121 may be made available by either preparing it or making prepared configuration data available.

In step S108, the transport configuration 121 and the radio configuration data 110 may be downloaded into the eNodeB 101 and in step S109 dependent nodes, for example MMEs or other eNodeBs are updated with new configuration data as well if required.

In step S110, the eNodeB connects to the OAM system or subsystem providing support for normal OAM functions after completion of the self-configuration process, the S1 links are set up and the planned X2 links are set up.

In step S111, the inventory system 100'' in the OAM is informed that a new eNodeB is in the field and the eNodeB performs a self test. The self test of different types can execute at different places within the self-configuration procedure. In step S112, the operator can be informed about the progress of the self-configuration process and important events occurring during the self-configuration process.

In step S113, the network resource models visible over Itf-N interface may be updated during and after the self-configuration process. In step S114, the process can end when all steps are successfully completed and when no exception or when an exception occurs. In step S114 the eNodeB is operational and can carry traffic.

The AAF 130, the OAM_CO_EF 131 and the SW_DLF 132 may be subsystems of an OAM/OSS system, of an integration apparatus 100 or an SCSS 100'''. Different subsystems may participate in the self-configuration process.

In order to organize the interaction between different logical functions or the different subsystems, for example providing an address to the NE 101 or allocating an address to the NE 101 or providing the NE 101 with basic information about its transport network a DHCP protocol may be used.

The DHCP protocol is described in the IETF (Internet Engineering Task Force) RFC (Request For Comment) 2131/2132 for DHCP V4 (Dynamic Host Configuration Protocol Version 4) or RFC 3315 for DHCP V6. Furthermore, a certain user profile of the DHCP protocol may be defined, which may be required for a true multi-vendor deployment.

DHCP may be able to allocate IP network addresses to a DHCP client, to configure DHCP clients with basic IP configuration parameters, which are required to exchange packets with another host in the concerned network and to configure DHCP clients with parameters not directly related to the IP protocol.

A exemplary usage profile of the DHCP protocol may encompass definitions for a specific usage of the "vendor-specific information options field for DHCP V4 and DHCP V6. Furthermore, the usage profile can comprise definitions for a specific usage of the private use options for DHCP V4. DHCP option fields 224-254 may be used as a private use options for DHCP V4.

The usage profile can also comprise a mechanism to align the usage of the option fields between DHCP V4 and DHCP V6. Furthermore, the usage profile comprises a versioning concept for the proposed extensions to the DHCP protocol based on the "vendor class identifier option", both for DHCP V4 and DHCP V6.

DHCP may be applicable to all IP networks and also to 3GPP (Third Generation Partnership Project) LTE/SAE networks. Networks which not base on the IP protocol may require different solution.

The IETF DHCP protocol is used to realize the address allocation function (AAF) 130, the OAM connectivity establishment function (OAM CO_EF) 131 or the functionality represented by these logical functions.

The network node 101 can comprise the AAF client 140 and the OAM CO_EF client 141, respectively, the identifying client device 130 and the linking client device 141. The network node 101, which is to be inserted into the network takes the role of a DHCP client and both the AAF server 131 and the OAM CO_EF server 131 take the role of a DHCP server.

The IP network address and the basic IP configuration parameters can be provided to the DHCP client 140, 141, 142 by the DHCP server 130, 131 with a standard DHCP functionality. Thus, no extensions or certain usage profiles are required to provide the network address to a network node 101. This network address may help identifying an activated network node 101.

However, to configure non-IP configuration parameters into the DHCP server 130, 131, 132 and, e.g., not into the client, certain extensions to the DHCP protocol may be defined. In other words, according to one exemplary embodiment, it is possible to use a DHCP protocol for configuring non-IP configuration parameters into a DHCP server. Thus, a certain usage profile thereof may be defined. Using a DHCP protocol may be fully backward compatible as DHCP options, the semantics of which are not known to a DHCP server, are ignored and may be discarded. Furthermore, a client may be provided with a network address of a server, i.e. a network address of a remote network equipment and not with the own network address.

This use of DHCP may facilitate implementing an automated insertion of a new network node into an operational network. Manually installing software and a configuration database may be prevented by automated insertion.

A modification of the network node 101 configuration should be done on site but the configuration can be performed in an autonomous way or by remote intervention from an OAM centre. Thus, the configuration may also be made through a remote commissioner. A remote commissioner may only need to physically install the network node and thus the presence of a skilled commissioner on site may be avoided. The required installation and configuration time therefore can be reduced and a faster network building may be possible and the OPEX for a network roll out may be reduced.

For automated self-configuring, it may be preferable to configure the network node 101 which has to be installed in the communication network, with certain configuration parameters beyond the basic connectivity provided by the usual operation of the DHCP protocol. For example, the IP addresses of the OAM/OSS subsystems for software download or the OAM/OSS subsystems for configuration data download may have to be configured.

Thus, a DHCP packet using "vendor-specific information" option and using "private use options" may be provided.

DHCP V4 can provide a special option field, e.g., the so-called vendor-specific information, that can be used to transmit vendor-specific information. The vendor-specific information option has the option code 43. This exemplary option can hold up to 253 sub-options. Each sub-option comprises an option tag part, an option length part and of the value part. The vendor specific sub-option tag may correspond to a Private Use Option. An example for a Private Use Option is provided in FIG. 3 and FIG. 4.

Also for DHCP V6, "vendor-specific information" option is specified. In DHCP V6 the vendor-specific information option has the option code 17. The "options" field of a DHCP V4 message allows to carry so-called tagged data items as described for example in IETF RFC 3132. The tag is a number. The value range of a tag ranges from 224 to 254. This may be assigned by the Internet assigned numbers authority (IANA), http://www.iana.org. The value range 224-254 can be freely used or privately used. The value part of the tag can carry the vendor-specific extension.

For example, DHCP V6 may not have any private use options.

According to an exemplary embodiment of the present invention, a special tag can be defined for each non-IP configuration attribute. This non-IP configuration attribute may be carried in the vendor-specific information option for DHCP V4 and DHCP V6 or in the private use options for DHCP V4.

For DHCP V4, it is possible to carry the configuration data or the basic configuration parameters or non-IP configuration attribute as default in the vendor-specific information field. Such modified DHCP packet can be provided in FIG. 5. FIG. 5 shows the option code 43 in the option field 501 of a modified DHCP package 500. The length of the option field 501 is 8 bits. The exemplary bits following the option field 501 can define the option length 502, which also is an 8 bit field.

In case when it is not possible to carry all data in one vendor-specific information option, the information can be transmitted in the private use options. Each of the private use options allows storing information of up to 255 octets. To indicate this situation, e.g. not all data carried in one vendor-specific information option, a special sub-option of vendor-specific information option can be defined and set.

The numbering of the private use option and the vendor-specific information sub-options can be aligned. That can mean that both, the sub-option X and the private use option X carry the same information, e.g., the IP address of the software download server. For example, sub-option 224 in both cases carries the IP address of a software server.

The numbering of the vendor-specific information sub-options for DHCP V4 and DHCP V6 can be aligned as well.

Depending on, e.g., the node 101 type and a hardware configuration of the node 101, the configuration data to be provided to the node may be different. For this reason, it may be preferable that the DHCP client 140, 141, 142 provides information about e.g., the nodes type and hardware to the DHCP server 130, 131, 132. It is possible to use the vendor class option for this purpose, which can be available in DHCP V4 and DHCP V6, with the examples thereof being shown in FIGS. 7 and 8.

The exemplary defined extensions for the DHCP protocol, e.g., the number of used sub-options or the tag for certain configuration information, can be modified from release to release. A release information makes the extension to the DHCP client flexible to future amendments. Therefore, it may be preferable to define a mechanism allowing the DHCP client 140, 141, 142 and the DHCP server 130, 131, 132 to obtain a common understanding on the used version of the Private Use Options or Vendor Specific Information Options.

For a common understanding on the used version for the Private Use Options or Vendor Specific Information Options, a release identifier or profile version may be introduced. For example, a unique identifier for each version or release of the extension to the DHCP protocol may be defined in order to differentiate between different versions of the extensions. This unique identifier can be an IP document version number string as defined in the 3GPP standard TS 32.311, or any other unique identifier like the International Enterprise number as defined by the IANA and the release information.

The DHCP client 140, 141, 142 can transfer the unique identifier of the supported release to the DHCP server 130, 131, 132. It is possible to carry this information in the vendor class option. The vendor class option is available for DHCP V4 and DHCP V6. The client 140, 141, 142 is thus supposed to support only one version.

FIG. 7 and FIG. 8 show exemplary DHCP packets including release information for DHCP V4 and DHCP V6. DHCP V4 uses Vendor Class Option Identifier 60 700 and put release information in $7^{th}$ and $8^{th}$ octed 701 behind enterprise number 702. DHCP V6 use Vendor Class Option 16 800 and transport release information 801 behind an enterprise-number 802. Thus, the information used may be the international enterprise number 702, 802 as defined by the IANA and a release information 701, 801

The DHCP server can read the release identifier in the vendor class option and constructs DHCP messages according to the indicated release identifier. The DHCP server 130, 131, 132 can thus support multiple releases of the extension to the DHCP.

As an example, the following sub-option tags or private use option tags according to table 1 can be provided.

TABLE 1

| SOFTWARE-DOWNLOAD-SERVER = 224 |
| DATABASE-DOWNLOAD-SERVER = 225 |
| OAM-SYSTEM-SERVER = 226 |
| ... |
| USE_PRIVATE_OPTIONS = 253 |

Thus, a code 224 can be defined for a software-download-server, a code 225 can be defined for a database-download server, a code 226 can be defined for an OAM system server and a code 253 can be defined for use_private_options or other server.

FIG. 3 shows an exemplary DHCP V4 private use option tag structure for providing a software download server. The code field 301 can comprise the code number 224 identifying a software download server. The software download server option can hold up to two IP V4 addresses 303, 304.

First IP V4 address can comprise a field a11, a12, a13, a14 and second IP V4 address comprises field a21, a22, a23, a24. The software download server option 224 may further comprise a single port number between 0 and 65536 in the port number field 305, p1, p2. At least one IP address can be provided. If the second IP address is not used, the four octets a21, a22, a23, a24 can be set to 0. If the port numbers p1, p2 are set to 0, the client use a standard port number.

In FIG. 4, a DHCP V4 private use option tag structure for providing a database download server is shown. For the example of the database download server, the option can contain an IP V4 address 403, a1, a2, a3, a4. Optionally, the database download server can comprise a port number 404, p1, p2.

The code for database download server may be referenced as 225 which is provided in field 401.

In FIG. 3, the length field 302 indicates that the length of the software download server option comprises 10 octets. The length field 402 of the database download server can indicate that the database download server option comprises 6 octets a1, a2, a3, a4, p1, p2. If the standard port number is used, the two octets indicating the port number 404 can be set to 0.

In FIG. 5, the vendor-specific information option 500 is shown, which comprises the Private Use Option shown in FIGS. 3 and 4. For example, behind the option length octet 502, the software server octet 301 can be provided. Again, the length field of the software download server option 302 can be set to 10. Behind the length field 302, the IP V4 addresses 303, 304 of the software download server option may be provided and behind the IP addresses the port number 305 is provided.

The vendor-specific information option 500 shown in FIG. 5 can also comprise a database download server option starting with the DB_server code field 401 which follows the length field 402 indicating a length of 6 octets. Behind the length field 402, the IP V4 address 403 may be provided and the DB download server port 404 can be provided.

Furthermore, the Vendor Specific Information Option of FIG. 5 can comprise an OAM system option 503. The OAM system option may also have a length field 504 of 6 and an IP V4 address, 505, OAM system server address. Then, the OAM server port 506 can be provided.

FIG. 6 shows how the Private Use Options of FIGS. 3 and 4 may be mapped into Vendor Specific Information Options in DHCP V6. Thus, FIG. 6 is similar to FIG. 5.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. In addition, to the extent that the prior art knowledge has not been explicitly incorporated by reference herein above, it is explicitly being incorporated herein in its entirety. All publications referenced herein above are incorporated herein by reference in their entireties.

EXEMPLARY ACRONYMS AND TERMINOLOGY

AAF: Address Allocation Function
SW_DF or
SW_DLF: Software Download Function
SC_PCF: Self Configuration Policy Control Function
SC_MF: Self Configuration Monitoring Function
SC_MCF: Self Configuration Monitoring and Control Function
RN: Radio Network
TN: Transport Network
NCL: Neighbor Cell List
CPL: Call Processing Link
PA: Pool Area
CD: Configuration Data
CO: Connectivity
PLF: Planning Function PRF: Preparation Function
SF: Splitter Function
DL: Download Function
EF: Establishment Function
AF: Activation Function

What is claimed is:

1. An integration apparatus for integrating a network node into a communication network by a self-configuration process, comprising:
   a monitoring device configured to detect an activation of the network node within the communication network;
   an identifying manager device configured to identify the activated network node
   a linking manager device is configured to establish a link between the network node and the integration apparatus; and
   a commissioning manager device configured to utilize the link to configure the network node, and
   wherein the network node is newly added to the communication network, the self-configuration process is triggered after the completion of an eNodeB self-test and configuration parameters are exchanged across the communication network to integrate the network node into the communication network via the self-configuration process.

2. The integration apparatus of claim 1, wherein the identifying manager device is further configured to provide an address allocation function, and wherein the address allocation function is configured to provide a basic configuration parameter to the network node.

3. The integration apparatus of claim 2, wherein the basic configuration parameter comprise control information for controlling, within the network node, an automated integration of the network node into the communication network.

4. The integration apparatus of claim 2, wherein the address allocation function is further configured to utilize a Dynamic Host Configuration Protocol (DHCP) for providing the basic configuration parameter.

5. The integration apparatus of claim 1, wherein the integration of the identified network node into the communication network is automatic.

6. The integration apparatus of claim 1, further comprising:
   a controller device configured to control the integration of the network node into the communication network, wherein the integration is automatic.

7. The integration apparatus of claim 1, further comprising:
   a policy device;
   wherein the identifying manager device configured to receive a policy from the policy device, the policy facilitating an integration of the identified network node into the communication network;
   wherein the commissioning manager device is further configured to perform a software download function, and
   wherein the software download function is configured to download software to the network node in accordance with the policy.

8. The integration apparatus of claim 1, wherein the commissioning manager device is further configured to perform a network planning function.

9. The integration apparatus of claim 8, wherein the network planning function is at least one of an online network planning function or an offline network planning function.

10. The integration apparatus of claim 1, wherein the commissioning manager device comprising an inventory device, and wherein the commissioning manager device is further configured to maintain the network inventory device up-to-date with a configuration of the communication network.

11. The integration apparatus of claim 1, further comprising:
    a policy device;
    wherein the identifying manager device configured to receive a policy from the policy device, the policy facilitating an integration of the identified network node into the communication network; and
    wherein the policy comprises a list of network addresses.

12. The integration apparatus of claim 1, wherein the eNodeB self-test is performed prior to integration of the network node to the communication network and the self-configuration process uses data from the self-test for the integration.

13. The integration apparatus of claim 1, wherein the network node is a eNodeB.

14. A network node comprising
    an identifying agent device configured to announce the network node to an integration apparatus;
    a linking agent device configured to establish a link between the network node and at least the integration apparatus;
    a commissioning agent device configured to receive commissioning information from the integration apparatus, and
    wherein the network node is integrated into a communication network by a self-configuration process; and
    wherein the network node is newly added to a communication network and is configured to perform a self-test and to trigger a self-configuration process after the completion of the self-test, and configuration parameters is exchanged across the communication network to integrate the network node into the communication network via the self-configuration process.

15. The network node of claim 14, further comprising:
    a controller device configured to receive control information from the integration apparatus for controlling, inside the network node, an automated integration of the network node in a communication network.

16. The network node of claim 15, wherein the controller device is further configured to receive the control information using a Dynamic Host Configuration Protocol (DHCP).

17. The network node of claim 14, wherein the network node is a eNodeB.

18. A communication network, comprising:
    at least one network node comprising
    an identifying agent device configured to announce the network node to an integration apparatus,
    a linking agent device configured to establish a link between the network node and at least the integration apparatus, and
    a commissioning agent device configured to receive commissioning information from the integration apparatus
    wherein at least one of the at least one network node is connected to another one of the at least one network node
    wherein the connection has been established by using an integration apparatus for integrating a network node into a communication network by a self-configuration process, and
    the integration apparatus including:
      a monitoring device configured to detect an activation of the network node within the communication network,
      a policy device,
      an identifying manager device configured to identify the activated network node and receive a policy from the policy device, the policy facilitating an integration of the identified network node into the communication network, a linking manager device is configured to establish a link between the network node and the integration apparatus, and a commissioning manager device configured to utilize the link to configure the network node in accordance with the policy, and wherein a self-configuration process is triggered after the completion of the network node self-test and configuration parameters is exchanged across the communication network to integrate the network node into the communication network via the self-configuration process.

19. A method of integrating a network node into a communication network by a self-configuration process, comprising:
detecting an activation of the network node within the communication network;
identifying the activated network node;
establishing a link between the network node and an integration apparatus;
utilizing the established link to configure the network node, and
wherein the network node is newly added to the communication network, a self-configuration process is triggered after the completion of an eNodeB self-test and configuration parameters is exchanged across the communication network to integrate the network node into the communication network via the self-configuration process.

20. A method in a network node for integrating the network node into a communication network by a self-configuration process, comprising:
announcing the network node to an integration apparatus;
establishing a link between the network node and the integration apparatus;
receiving commissioning information from the integration apparatus;
performing a self-test;
triggering a self-configuration process after the completion of the self-test; and
wherein the network node is newly added to the communication network, and configuration parameters are exchanged across the communication network to integrate the network node into the communication network via the self-configuration process.

21. A non-transitory computer-readable storage embodying a software arrangement for integrating a network node into a communication network by a self-configuration process, wherein, when the software arrangement is executed by a processing arrangement, the processing arrangement is configured to perform procedures comprising:
detecting an activation of the network node within the communication network;
identifying the activated network node;
establishing a link between the network node and an integration apparatus;
utilizing the established link to configure the network node, and
wherein the network node is newly added to the communication network, a self-configuration process is triggered after the completion of an eNodeB self-test and configuration parameters are exchanged across the communication network to integrate the network node into the communication network via the self-configuration process.

22. A non-transitory computer-readable storage embodying a software arrangement for integrating a network node into a communication network by a self-configuration process, wherein, when the software arrangement is executed by a processing arrangement, the processing arrangement is configured to perform procedures comprising:
announcing the network node to an integration apparatus;
establishing a link between the network node and the integration apparatus;
receiving commissioning information from the integration apparatus;
performing a network node self-test;
triggering a self-configuration process after the completion of the network self-test, and
wherein the network node is newly added to the communication network, and configuration parameters are exchanged across the communication network to integrate the network node into the communication network via the self-configuration process.

23. A non-transitory computer-readable storage medium for integrating a network node into a communication network by a self-configuration process and comprising a program, wherein program when being executed by a processing arrangement, the processing arrangement is configured to perform procedures comprising:
detecting an activation of the network node within the communication network;
identifying the activated network node;
receiving a policy which is configured to facilitate an integration of the network node into the communication network;
establishing a link between the network node and an integration apparatus;
utilizing the established link to configure the network node in accordance with the policy, and
wherein the network node is newly added to the communication network, a self-configuration process is triggered after the completion of an eNodeB self-test and configuration parameters are exchanged across the communication network to integrate the network node into the communication network via the self-configuration process.

24. A non-transitory computer-readable storage medium for integrating a network node into a communication network by a self-configuration process and comprising a program, wherein program when being executed by a processing arrangement, the processing arrangement is configured to perform procedures comprising:
announcing the network node to an integration apparatus;
establishing a link between the network node and the integration apparatus;
receiving commissioning information from the integration apparatus; and
performing a network self-test;
triggering a self-configuration process after the completion of the network node self-test, and
wherein the network node is newly added to the communication network, and configuration parameters are is exchanged across the communication network to integrate the network node into the communication network via the self-configuration process.

25. A method, comprising:
utilizing a Dynamic Host Configuration Protocol (DHCP) for controlling an integration of a network node into a communication network by a self-configuration process, and
wherein the network node is newly added to the communication network, a self-configuration process is triggered after the completion of an eNodeB self-test and configuration parameters is exchanged across the communication network to integrate the network node into the communication network via the self-configuration process.

* * * * *